United States Patent [19]

Papouchado

[11] 3,969,294

[45] July 13, 1976

[54] SEGMENTED COPOLYESTER ADHESIVES STABILIZED BY ALKALINE EARTH OXIDES AND CARBOXYLIC COMPOUNDS

[75] Inventor: Lucien Marc Papouchado, Wilmington, Del.

[73] Assignee: E. I. Du Pont de Nemours and Company, Wilmington, Del.

[22] Filed: Feb. 26, 1975

[21] Appl. No.: 553,078

[52] U.S. Cl. ............................... 260/26; 260/28 R; 260/45.75 R; 260/45.85 R; 260/829; 260/184 R; 260/873
[51] Int. Cl.² ......................................... C08L 93/00
[58] Field of Search ................ 260/26, 28, 45.75 R, 260/45.85 R

[56] References Cited
UNITED STATES PATENTS 3,832,314   8/1974   Hoh et al. ............................. 260/26

Primary Examiner—Lewis T. Jacobs
Assistant Examiner—William E. Parker

[57] ABSTRACT

Thermally stabilized thermoplastic hot melt adhesive compositions which comprise, based on the total thermoplastic components, (A) 1 to 99 percent by weight of thermoplastic segmented copolyester elastomer consisting essentially of a multiplicity of recurring short chain ester units and long chain ester units joined through ester linkages, said short chain ester units amounting to 15 to 75 percent by weight of said copolyester and being of the formula

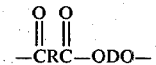

and said long chain ester units amounting to 25 to 85 percent by weight of said copolyester and being of the formula

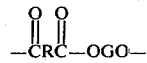

wherein R is the divalent radical remaining after removal of the carboxyl groups from a dicarboxylic acid having a molecular weight of less than 350, D is the divalent radical remaining after removal of the hydroxyl groups from organic diol having a molecular weight of less than 250, and G is the divalent radical remaining after removal of the terminal hydroxyl groups from long chain glycol having an average molecular weight of 350 to 6000, said copolyester having a melt index of less than 150 and a melting point of at least 90°C.; (B) 1 to 99 percent by weight of low molecular weight thermoplastic resin which forms compatible mixtures with the segmented copolyester, is thermally stable at 150°C., and has a melt viscosity of less than 10,000 centipoises at 200°C.; stabilized with (C) 5 to 30 percent by weight, preferably 8.0 to 20 percent by weight, based on the weight of elastomer and resin, of an alkaline earth oxide, in combination with (D) 0.05 to 5.0 percent by weight of a carboxylic compound of an aromatic or aliphatic compound having at least two carboxylic acid groups or anhydrides thereof. Preferably (C) is calcium oxide and (D) is pyromellitic dianhydride.

41 Claims, No Drawings

SEGMENTED COPOLYESTER ADHESIVES STABILIZED BY ALKALINE EARTH OXIDES AND CARBOXYLIC COMPOUNDS

BACKGROUND OF THE INVENTION

1. Field of the Invention

This invention relates to thermally stabilized adhesive compositions of thermoplastic segmented copolyester elastomers and at least one compatible low molecular weight thermoplastic resin, and to methods for preparing such compositions.

2. Description of the Prior Art

Copolyesters, and particularly segmented copolyester elastomers, are used in the formulation of adhesives such as those useful as hot melt adhesives. Such adhesive compositions are described in U.S. Pat. No. 3,832,314. The compositions of this patent have good bond strength as hot melt adhesives. In order to provide good adhesive properties the viscosity of the adhesive blend must be maintained at a relatively constant level. It has been found that at elevated temperatures, particularly in the range of 170 to 200°C., over a period of several hours the aforementioned adhesive compositions lose viscosity and hence their bonding properties are reduced. Stabilizers or antioxidants such as tetrakis[methylene-3-(3',5'-ditertiary-butyl-4'-hydroxyphenyl) propionate] methane, and phosphite ester compounds, have been incorporated in compositions containing segmented copolyesters, but the known stabilizers have not proved to be very effective over extended periods of time, e.g., 2 hours and more.

Other stabilizers have been added to adhesive compositions prepared from thermoplastic segmented copolyester elastomers and thermoplastic resins. A particularly effective stabilizer is an alkaline earth oxide, 0.1 to 4.0 percent by weight, based on the weight of elastomer and resin, as disclosed in Eastman, U.S. Ser. No. 470,266, filed Feb. 20, 1974. Improved adhesive compositions according to Eastman also can contain 0.1 to 1.0 percent by weight, based on the weight of elastomer and resin, of a substantially linear polycarbodiimide having an average of at least two carbodiimide groups per molecule.

While the Eastman stabilizers have proved beneficial, it has been found that the shelf-life of the adhesive composition is short resulting in a loss of stability, particularly if the adhesive composition is in pelletized form.

SUMMARY OF THE INVENTION

In accordance with this invention improved thermally stabilized thermoplastic hot melt adhesive compositions are provided which comprise, based on the total thermoplastic components, (A) 1 to 99 percent by weight of thermoplastic segmented copolyester elastomer consisting essentially of a multiplicity of recurring short chain ester units and long chain ester units joined through ester linkages, said short chain ester units amounting to 15 to 75 percent by weight of said copolyester and being of the formula

and said long chain ester units amounting to 25 to 85 percent by weight of said copolyester and being of the formula

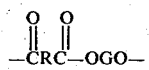

wherein R is the divalent radical remaining after removal of the carboxyl groups from a dicarboxylic acid having a molecular weight of less than 350, D is the divalent radical remaining after removal of the hydroxyl groups from organic diol having a molecular weight of less than 250, and G is the divalent radical remaining after removal of the terminal hydroxyl groups from long chain glycol having an average molecular weight of 350 to 6000, said copolyester having a melt index of less than 150 and a melting point of at least 90°C.; (B) 1 to 99 percent by weight of low molecular weight thermoplastic resin which forms compatible mixtures with the segmented copolyester, is thermally stable at 150°C., and has a melt viscosity of less than 10,000 centipoises at 200°C.; stabilized with (C) 5.0 to 30 percent by weight, preferably 8.0 to 20 percent by weight, based on the weight of elastomer and resin, of an alkaline earth oxide, in combination with (D) 0.05 to 5.0 percent by weight, based on the weight of elastomer and resin, of a carboxylic compound taken from the group consisting of an aromatic compound having at least two carboxylic acid groups, an aliphatic compound having at least two carboxylic acid groups, and anhydrides thereof.

A preferred carboxylic compound is pyromellitic dianhydride and the acid from which the dianhydride is derived, preferably present in 0.1 to 1.0 percent by weight, based on the weight of elastomer and resin.

DETAILED DESCRIPTION OF THE INVENTION

The stabilized thermoplastic segmented copolyester elastomers (Component A) used in the compositions of this invention consist essentially of 15 to 75 percent recurring short chain ester units and 25 to 85 percent long chain ester units joined through ester linkages. The term "short chain ester units", as applied to units in a polymer chain, refers to the reaction products of low molecular weight diols with dicarboxylic acids to form repeat units having molecular weights of less than about 550. These units are also referred to herein as "hard segments". The term "long chain ester units", as applied to units in a polymer chain, refers to the reaction products of long chain glycols with dicarboxylic acids. These units are also referred to herein as "soft segments". Preferably the copolyester consists essentially of 15 to 65 percent hard segments and 35 to 85 percent soft segments.

The soft thermoplastic segmented copolyester elastomers of this invention consist essentially of about 15 to 50 percent recurring short chain ester units and about 50 to 85 percent long chain ester units joined through ester linkages. In these elastomers the term "short chain ester units", as applied to units in a polymer chain, refers to the reaction of butanediol (BDO) with dicarboxylic acids. These units are also referred to herein as "hard segments". In these elastomers the term "long chain ester units", as applied to units in a polymer chain, refers to the reaction products of polytetramethylene ether glycol (PTMEG) with dicarboxylic acids. These units are also referred to herein a "soft segments". Preferably, the copolyester consists essentially of about 15 to less than 30 percent hard segments and more than 70 to 85 percent soft segments.

The weight percent of long chain ester (LCE) units specified herein are calculated in accordance with the following equation in which both the numerator and denominator are expressed in grams.

$$\text{Wt. \% LCE} = \frac{A+B-C}{\text{Theoretical Polymer Yield}}$$

A = (Moles of PTMEG)×(Mole Wt. of PTMEG)
B = (Total Moles of phthalate as Acid)×(Mole Wt. of phthalic Acid Mixture)
C = (Moles $H_2O$)×(Mole Wt. of $H_2O$)

In this equation the moles of phthalate will be the same as the moles of PTMEG and the moles of water will be twice that of PTMEG. The mole weight of the phthalic acid mixture should be a weighted average reflecting the composition of the mixture. The theoretical polymer yield will be the grams of ingredients put into the reaction minus the grams of by-product and excess ingredients distilled off.

The weight percent of short chain ester (SCE) units is defined in an analogous manner:

$$\text{Wt. \% SCE} = \frac{D+E-F}{\text{Theoretical Polymer Yield}}$$

D = (Moles of BDO)×(Mole Wt. of BDO)
E = (Total Moles of phthalate as Acid)×(Mole Wt. of phthalic Acid Mixture)
F = (Moles $H_2O$)×(Mole Wt. of $H_2O$)

Here the moles of butanediol do not include any stoichiometric excess.

The copolyesters used in accordance with this invention are prepared by polymerizing with each other (a) one or more dicarboxylic acids such as cyclic, aromatic and aliphatic dicarboxylic acids, preferably aromatic dicarboxylic acids, (b) one or more low molecular weight diols. The term "dicarboxylic acid", as used herein, is intended to include the equivalents of dicarboxylic acids, that is, their esters or ester-forming derivatives such as acid chlorides and anhydrides, or other derivatives which behave substantially like dicarboxylic acids in a polymerization reaction with glycol. By the term "aromatic dicarboxylic acid" is meant a dicarboxylic acid in which each carboxyl group is attached to a carbon atom in an isolated or fused benzene ring or a ring which is itself fused to a benzene ring. Specifically, in preparing the soft thermoplastic segmented copolyester elastomers (a) a mixture of aromatic dicarboxylic acids containing about 55 to 95 percent by weight of terephthalic acid, (b) polytetramethylene ether glycol and (c) butanediol are polymerized with each other.

The dicarboxylic acid monomers useful herein have a molecular weight of less than about 350. This molecular weight requirement pertains to the acid itself and not to its ester or ester-forming derivative. Thus, the ester of a dicarboxylic acid having a molecular weight greater than 350 is included in this invention provided the acid itself has a molecular weight below about 350.

The dicarboxylic acids used in the preparation of the segmented copolyester are aromatic, cycloaliphatic or aliphatic dicarboxylic acids of low molecular weight and can contain any substituent groups or combination thereof which do not interfere with the polymerization reaction. Representative aromatic dicarboxylic acids include terephthalic acid, isophthalic acid, phthalic acid, bibenzoic acid, substituted dicarboxy compounds with benzene nuclei such as bis(p-carboxyphenyl) methane, p-oxy(p-carboxyphenyl) benzoic acid, ethylene-bis(p-oxybenzoic acid), ethylene-bis-(p-benzoic acid), tetramethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, indene dicarboxylic acid, and the like, as well as ring substituted derivatives thereof such as $C_1$–$C_{10}$ alkyl, halo, alkoxy or aryl derivatives. Hydroxy acids such as p($\beta$-hydroxyethoxy) benzoic acid can also be used providing an aromatic dicarboxylic acid is also present.

Representative cycloaliphatic and aliphatic acids include sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethyl-malonic acid, 2-ethylsuberic acid, 2,2,3,3-tetramethylsuccinic acid, cyclopentanedicarboxylic acid, decahydro-1,5-naphthylene dicarboxylic acid, 4,4'-bicyclohexyl dicarboxylic acid, decahydro-2,6-naphthylene dicarboxylic acid, 4,4'-methylenebis-(cyclohexyl) carboxylic acid, 3,4-furan dicarboxylic acid, and 1,1-cyclobutane dicarboxylic acid. Preferred acids are cyclohexane-dicarboxylic acids and adipic acid.

The preferred dicarboxylic acids for preparation of the segmented copolyester are the aromatic acids of 8 to 16 carbon atoms, particularly phenylene dicarboxylic acids such as phthalic, terephthalic and isophthalic acids. The most preferred acids are terephthalic acid and mixtures of terephthalic and isophthalic acids. In the soft copolyester elastomer, preferably, the mixture of aromatic dicarboxylic acids contains about 60 to 95 percent terephthalic acid.

The low molecular weight diols used in the preparation of the hard segments of the copolyesters have molecular weights of less than about 250. The term "low molecular weight diol", as used herein, should be construed to include equivalent ester-forming derivatives. In this case, however, the molecular weight requirement pertains to the diol only and not to its derivatives.

Suitable low molecular weight diols which react to form the short chain ester units of the copolyesters include acyclic, alicyclic and aromatic dihydroxy compounds. The preferred diols are those with 2 to 15 carbon atoms such as ethylene, propylene, tetramethylene, isobutylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, and the like. Especially preferred are the aliphatic diols of 2 to 8 carbon atoms. Suitable bisphenols include bis(p-hydroxy) diphenyl, bis(p-hydroxyphenyl) methane, bis(p-hydroxyphenyl) ethane, bis(p-hydroxyphenyl) propane and 2,2-bis(p-hydroxyphenyl) propane. Equivalent ester-forming derivatives of diols are also useful. For example, ethylene oxide or ethylene carbonate can be used in place of ethylene glycol.

The long chain glycols used to prepare the soft segments of these copolyesters have molecular weights of about 350 to 6000, and preferably about 600 to 3000.

Preferably the long chain glycols have melting points of less than about 75°C.

The chemical structure of the long chain polymeric part of the long chain glycol is not critical. Any substituent groups which do not interfere with the polymerization reaction to form the copolyester can be present. Thus, the chain can be a single divalent acyclic, alicyclic, or aromatic hydrocarbon group, poly(alkylene oxide) group, polyester group, a combination thereof, or the like. Any of these groups can contain substituents which do not interfere to any substantial extent with the polymerization to form the copolyester used in accordance with this invention. The hydroxy functional groups of the long chain glycols used to prepare the copolyesters should be terminal groups to the extent possible.

Suitable long chain glycols which can be used in preparing the soft segments of the copolymers include poly(alkylene ether) glycols in which the alkylene groups are of 2 to 9 carbon atoms such as poly(ethylene ether) glycols, poly(1,2- and 1,3-propylene ether) glycol, poly(1,2-butylene ether) glycol, poly(tetramethylene ether) glycol, poly(pentamethylene ether) glycol, poly(hexamethylene ether) glycol, poly(heptamethylene ether) glycol, poly(octamethylene ether) glycol, poly(nonamethylene ether) glycol, and random or block copolymers thereof, for example, glycols derived from ethylene oxide and 1,2-propylene oxide.

Glycol esters of poly(alkylene oxide) dicarboxylic acids can also be used as the long chain glycol. These glycols may be added to the polymerization reaction or may be formed in situ by the reaction of a dicarboxymethyl acid of poly(alkylene oxide) such as $HOOCCH_2(OCH_2CH_2CH_2CH_2)_xOCH_2COOH$ with the low molecular weight diol, which is always present in a stoichiometric excess. The resulting poly(alkylene oxide) ester glycol then polymerizes to form G units having the structure $—DOOCCH_2(OCH_2CH_2CH_2CH_2)_x-OCH_2COOD—$ in which each diol cap (D) may be the same or different depending on whether more than one diol is used. These dicarboxylic acids may also react in situ with the long chain glycol, in which case a material is obtained having a formula the same as above except that the D's are replaced by G's, the polymeric residue of the long chain glycol. The extent to which this reaction occurs is quite small, however, since the low molecular weight diol is present in considerable excess.

Polyester glycols can also be used as the long chain glycol. In using polyester glycols, care must generally be exercised to control the tendency to interchange during melt polymerization. Certain sterically hindered polyester, e.g., poly(2,2-dimethyl-1,3-propylene adipate), poly(2,2-dimethyl-1,3-propylene/2 -methyl-2-ethyl-1,3-propylene 2,5-dimethylterephthalate), poly(2,2-dimethyl-1,3-propylene/2,2-diethyl-1,3-propylene, 1,4-cyclohexanedicarboxylate) and poly(1,2-cyclohexylene-dimethylene/2,2-dimethyl-1,3-propylene, 1,4-cyclohexane-dicarboxylate) can be utilized under normal reaction conditions, and other more reactive polyester glycols can be used if proper reaction conditions, including a short residence time, are employed.

Suitable long chain glycols also include polyformals prepared by reacting formaldehyde with glycols such as pentamethylene glycol or mixtures of glycols such as a mixture of tetramethylene and pentamethylene glycols. Polythioether glycols also provide useful products. Polybutadiene and polyisoprene glycols, copolymers of these, and saturated hydrogenation products of these materials are also satisfactory long chain polymeric glycols. In addition, the glycol esters of dicarboxylic acids formed by oxidation of polyisobutylene-diene copolymers are useful raw materials. The preferred long chain glycols are poly(alkylene ether) glycols and glycol esters of poly(alkylene oxide) dicarboxylic acids.

Butanediol is used in the preparation of the hard segments of preferred copolyester elastomers. The term "butanediol", as used herein, should be construed to include equivalent ester-forming derivatives such as tetrahydrofuran or butanediacetate. The polytetramethylene ether glycols used to prepare the soft segments of these copolyester elastomers have molecular weights of about 600 to 3500, and preferably about 600 to 2100.

The relative molecular weight of the segmented copolyester is expressed herein in terms of melt index, which is an empirical measurement of inverse melt viscosity. The segmented copolyester elastomers should have a melt index of less than about 150, less than about 30 for the soft elastomers, in order to provide useful compositions. The lower melt indices provide compositions having superior pressure sensitive properties. The melt indices specified herein are determined by the Americal Society for Testing and Materials (herein abbreviated "ASTM") test method D 1238-65T using Condition L at 230°C. (melt indices of soft elastomers were determined using Condition E at 190°C.) with a 2160 gram load.

The segmented copolyesters have a melting point of at least about 90°C., preferably a melting point of at least about 140°C. The high melting segmented copolyesters used herein maintain their high melting characteristics when blended with low molecular weight thermoplastic resins in accordance with this invention.

The high melting pont of the segmented copolyester is obtained by providing the polyester with crystallizable short chain ester segments. Crystallinity in the short chain ester segments is increased by the use of more linear and symmetrical diacid illustrated with aromatic diacids. By "linear" aromatic diacid is meant a diacid in which each of the bonds between the carboxyl carbons and their adjacent carbons fall on a straight line drawn from one carboxyl carbon to the other. By "symmetrical" aromatic diacid is meant a diacid which is symmetrical with respect to a center line drawn from one carboxyl carbon to the other. For example, repeating ester units such as tetramethylene terephthalate give an especially high melting short chain ester segment. On the other hand, when a nonlinear and unsymmetrical aromatic diacid, such as isophthalic acid, is added to crystallizable short chain ester segments, their melting point is depressed. Small amounts of isophthalic acid are, however, very useful for controlling the melting point and improving the compatibility of segmented copolyesters with low molecular weight thermoplastic resins. In preparing the harder copolyester elastomers aliphatic dibasic acids should be avoided since they give low melting or noncrystalline short chain ester segments without any significant beneficial effects.

The melting points specified herein are determined by differential thermal or thermomechanical analysis. In thermal analysis the melting point is read from the position of the endotherm peak in a thermogram when the sample is heated from room temperature at the range of 10°C./min. The details of this method are described in many publications, for example, by C. B. Murphy in *Differential Thermal Analysis*, R. C. Mackenzie, Editor, Volume I, Pages 643 to 671, Academic Press, New York, 1970. In thermomechanical analysis the melting point is determined by measuring penetration of a penetrometer type probe into a polymer sample at 10 grams load with the temperature programmed at 5°C./min. The details of this method are described in many publications, for example, in *Du Pont Technical Literature for Model 941 Thermomechanical Analyzer*, Du Pont Co., Wilmington, Delaware, October 1, 1968.

Preferred segmented copolyester elastomers are those in which the aromatic dicarboxylic acid is of 8 to 16 carbon atoms, the low molecular weight diol is aliphatic diol of 2 to 8 carbon atoms, the long chain glycol is poly(alkylene ether) glycol in which the alkylene group is of 2 to 9 carbon atoms, the short chain ester units amount to about 30 to 65 percent by weight of the copolyester, the long chain ester units amount to about 35 to 70 percent by weight of the copolyester, and the copolyester has a melt index of less than about 50 and a melting point of at least about 140°C.

The copolyester elastomers prepared from terephthalic acid, or a mixture of terephthalic and isophthalic acids, 1,4-butanediol and polytetramethylene ether glycol having a molecular weight of about 600 to 3000 are particularly preferred in the compositions of this invention. The raw materials are readily available, and the adhesive and coating properties of compositions obtained from such polymers are outstanding.

The copolyester elastomers used in the compositions of this invention can be made by conventional condensation polymerization procedures, as for example, in bulk or in a solvent medium which dissolves one or more of the monomers. They are conveniently prepared by a conventional ester interchange reaction. A preferred procedure involves heating, for example, the dimethyl ester of terephthalic acid, or a mixture of terephthalic and isophthalic acids, with a long chain glycol which may be polytetramethylene ether glycol and an excess of a short chain diol which may be butanediol in the presence of a catalyst at 150° to 260°C., followed by distilling off the methanol formed by the interchange. Heating is continued until methanol evolution is complete. Depending on the temperature, catalyst and diol excess, this polymerization is complete within a few minutes to a few hours. This procedure results in the preparation of a low molecular weight prepolymer which can be converted to the high molecular weight segmented copolyester of this invention.

These prepolymers can also be prepared by a number of alternate esterification or ester interchange processes. For example, the long chain glycol can be reacted with a high or low molecular weight short chain ester homopolymer or copolymer in the presence of catalyst until randomization occurs. The short chain ester homopolymer of copolymer can be prepared by ester interchange from either the dimethyl esters and low molecular weight diols, as above, or from the free acids with the diol acetates. Alternatively, the short chain ester copolymer can be prepared by direct esterification from appropriate diacids, anhydrides, or acid chlorides, for example, with diols or by other processes such as reaction of the diacids with cyclic ethers or carbonates. Obviously the prepolymer can also be prepared by carrying out these processes in the presence of the long chain glycol.

The resulting prepolymer is then converted to the high molecular weight segmented copolyester elastomer by distillation of the excess of short chain diol. Best results are usually obtained if this final distillation is carried out at less than 1 mm. pressure and 240°–260°C. for less than 2 hours in the presence of an antioxidant such as sym-di-beta-naphthyl-p-phenylenediamine or 1,3,5-trimethyl-2,4,6-tris[3,5-ditertiary-butyl-4-hydroxybenzyl] benzene.

Most practical polymerization techniques rely upon ester interchange to complete the polymerization reaction. In order to avoid excess hold times at high temperatures with possible irreversible thermal degradation, it is advantageous to employ a catalyst for the ester interchange reaction. While a wide variety of catalysts can be used, organic titanates such as tetrabutyl titanate, used alone or in combination with magnesium or zinc acetates, are preferred. Complex titanates, such as $Mg[HTi(OR)_6]_2$, derived from alkali or alkaline earth metal alkoxides and titanate esters are also very effective. Inorganic titanates such as lanthanum titanate, calcium acetate/antimony trioxide mixtures and lithium and magnesium alkoxides are representative of other catalysts which can be used.

While these condensation polymerizations are generally run in the melt without added solvent, it is sometimes advantageous to run them in the presence of inert solvent in order to facilitate removal of volatile products at lower than usual temperatures. This technique is especially valuable during prepolymer preparation, for example, by direct esterification. However, certain low molecular weight diols, for example, butanediol in terphenyl, are conveniently removed during high polymerization by azeotropic distillation. Other special polymerization techniques, for example, interfacial polymerization of bisphenol with bisacylhalides and bisacylhalide capped linear diols, may prove useful for preparation of specific polymers.

The processes described above can be run both by bath and continuous methods. The preferred method for continuous polymerization, namely, ester interchange with a prepolymer, is a well established commercial process.

In addition to the segmented copolyester, the compositions of this invention contain one or more low molecular weight thermoplastic resins (Component B) which form compatible mixtures with the segmented copolyester, are thermally stable at about 150°C., and have melt viscosities of less than about 10,000 centipoises at 200°C. The term "thermoplastic resin", as used throughout the specification and claims, is intended to include heat softenable resins, both natural and synthetic, as well as waxy types of materials. By the term "compatible" it is meant that there is no separation into distinct layers between the segmented copolyester and the low molecular weight resin or resins at the copolyester melt temperature. In some cases this compatibility is achieved in multi-component blends, even though one of the low molecular weight thermoplastic resin components may not be compatible with the segmented copolyester elastomer alone. By the phrase "thermally stable", it is meant that there is no significant permanent alteration in the properties of the resin after heating at the specified temperature for 1 hour in the presence of air. The melt viscosities specified herein are measured with a Brookfield viscometer by ASTM test method D 1824-66 at elevated temperatures as indicated.

Suitable low molecular weight thermoplastic resins include hydrocarbon resins, bituminous asphalts, coal tar pitches, rosins, rosin based alkyd resins, phenolic resins, chlorinated aliphatic hydrocarbon waxes, chlorinated polynuclear aromatic hydrocarbons, and mixtures thereof.

The term "hydrocarbon resins" refers to hydrocarbon polymers derived from coke-oven gas, coal-tar fractions, cracked and deeply cracked petroleum stocks, essentially pure hydrocarbon feeds, and turpentines. Typical hydrocarbon resins include coumarone-indene resins, petroleum resins, styrene polymers, cyclopentadiene resins, and terpene resins. These resins are fully described in the Kirk-Othmer "Encyclopedia of Chemical Technology", Second Edition, 1966, Interscience Publishers, New York, Volume 11, Pages 242 to 255.

The term "coumarone-indene resins" refers to hydrocarbon resins obtained by polymerization of the resin formers recovered from coke-oven gas and in the distillation of coal tar and derivatives thereof such as phenol-modified coumarone-indene resins. These resins are fully described in the Kirk-Othmer Encyclopedia, supra, Volume 11, Pages 243 to 247.

The term "petroleum resins" refers to hydrocarbon resins obtained by the catalytic polymerization of deeply cracked petroleum stocks. These petroleum stocks generally contain mixtures of resin formers such as styrene, methyl styrene, vinyl toluene, indene, methyl indene, butadiene, isoprene, piperylene and pentylenes. These resins are fully described in the Kirk-Othmer Encyclopedia, supra, Volume 11, Pages 248 to 250. The so-called "polyalkylaromatic resins" fall into this classification.

The term "styrene polymers" refers to low molecular weight homopolymers of styrene as well as copolymers containing styrene and other comonomers such as alpha-methyl-styrene, vinyl toluene, butadiene, and the like when prepared from substantially pure monomer.

The term "vinyl aromatic polymers" refers to low molecular weight homopolymers of vinyl aromatic monomers such as styrene, vinyl toluene, and alphamethyl styrene, copolymers of two or more of these monomers with each other, and copolymers containing one or more of these monomers in combination with other monomers such as butadiene, and the like. These polymers are distinguished from petroleum resins in that they are prepared from substantially pure monomer.

The term "cyclopentadiene resins" refers to cyclopentadiene homopolymers and copolymers derived from coal tar fractions or from cracked petroleum streams. These resins are produced by holding a cyclopentadiene-containing stock at elevated temperature for an extended period of time. The temperatures at which it is held determines whether the dimer, trimer, or higher polymer is obtained. These resins are fully described in the Kirk-Othmer Encyclopedia, supra, Volume 11, Pages 250 and 251.

The term "terpene resins" refers to polymers of terpenes which are hydrocarbons of the general formula $C_{10}H_{16}$ occurring in most essential oils and oleoresins of plants, and phenol-modified terpene resins. Suitable terpenes include alpha-pinene, beta-pinene, dipentene, limonene, myrcene, bornylene, camphene, and the like. These products occur as by-products of coking operations of petroleum refining and of paper manufacture. These resins are fully described in the Kirk-Othmer Encyclopedia, supra, Volume 11, Pages 252 to 254.

The term "bituminous asphalts" is intended to include both native asphalts and asphaltites such as Gilsonite, Glance pitch and Grahanite. A full description of bituminous asphalts can be found in Abraham's "Asphalts and Allied Substances", 6th Edition, Volume 1, Chapter 2, Van Nostrand Co., Inc., particularly Table III on Page 60.

The term "coal tar pitches" refers to the residues obtained by the partial evaporation of distillation of coal tar obtained by removal of gaseous components from bituminous coal. Such pitches include gas-works coal tar pitch, coke-oven coal tar pitch, blast-furnace coal tar pitch, producer-gas coal tar pitch, and the like. These pitches are fully described in Abraham's "Asphalts and Allied Substances", supra, particularly Table III on Page 61.

The term "rosins" refers to the resinous materials that occur naturally in the oleoresin of pine trees, as well as derivatives thereof including rosin esters, modified rosins such as fractionated, hydrogenated, dehydrogenated and polymerized rosins, modified rosin esters and the like. These materials are fully described in the Kirk-Othmer Encyclopedia, supra, Volume 17, Pages 475 to 505.

The term "rosin based alkyd resins" refers to alkyd resins in which all or a portion of the monobasic fatty acid is replaced by rosin (a mixture of diterpene resin acids and non-acidic components). Unmodified alkyd resins are polyester products composed of polyhydric alcohol, polybasic acid and monobasic fatty acid. Rosin based alkyd resins are described in the Kirk-Othmer Encyclopedia, supra, Volume 1, Pages 851, 865 and 866.

The term "phenolic resins" refers to the products resulting from the reaction of phenols with aldehydes. In addition to phenol itself, cresols, xylenols, p-tert.-butylphenol, p-phenylphenol and the like may be used as the phenol component. Formaldehyde is the most common aldehyde, but acetaldehyde, furfuraldehyde and the like may also be used. These resins are fully described in the Kirk-Othmer Encyclopedia, supra, Volume 15, Pages 176 to 207.

The term "chlorinated aliphatic hydrocarbon waxes" refers to those waxes which are commonly called "chlorinated waxes" such as chlorinated paraffin waxes. These waxes typically contain about 30–70 percent by weight of chlorine.

The term "chlorinated polynuclear aromatic hydrocarbons" refers to chlorinated aromatic hydrocarbons containing two or more aromatic rings such as chlorinated biphenyls, terphenyls, and the like, and mixtures thereof. These materials typically contain 30 to 70 percent by weight of chlorine.

The compositions of this invention contain about 1 to 99 percent by weight, preferably 5 to 95 percent by weight, of thermoplastic segmented copolyester elastomer and about 1 to 99 percent by weight, preferably 5 to 95 percent by weight, of low molecular weight thermoplastic resin. More preferably, the composition contains about 20 to 60 percent by weight of elastomer and about 40 to 80 percent by weight of resin.

Typically the compositions of this invention contain more than one low molecular weight thermoplastic resin. For example, low molecular weight vinyl aromatic polymers, e.g., styrene polymers, have been found to lower the melt viscosity of these compositions without substantially lowering the softening point. Since low melt viscosity contributes improved wetting by the composition of the surface of the substrate, which results in better adhesion, many useful compositions will contain some vinyl aromatic polymer. Vinyl aromatic polymers such as styrene are also useful for increasing the compatibility of other resins with the segmented copolyester elastomer. Coumarone-indene resins of high softening point have been found to give strength to the compositions. Phenol-modified coumarone-indene resins have been found to have the effect of lowering the softening point of the compositions. In fact, the effect of phenol-modified coumarone-indene resins on the melting point is so great that the desired melting point is generally achieved by the addition of only a small amount of this resin. Any combination of these desired properties can be achieved by mixing two or more low molecular weight thermoplastic resins with the copolyester elastomer in a proper proportion. The low molecular weight thermoplastic resins also have the effect of lowering the cost of the composition.

In order to provide adhesive compositions prepared from segmented elastomers and at least one compatible thermoplastic resin having improved shelf-life (moisture resistance) as well as maintaining other properties such as adhesion and viscosity, it is necessary that to the adhesive compositions there is added, in combination, the following components:

C. 5.0 to 30 percent by weight, preferably 8.0 to 20 percent by weight, based on the weight of the elastomer and resin components, of an alkaline earth oxide, and D. 0.05 to 5.0 percent by weight, based on the weight of the elastomer and resin components, of a carboxylic compound taken from the group consisting of an aromatic acid having at least two carboxylic acid groups, an aliphatic acid having at least two carboxylic acid groups and anhydrides of said acids. The carboxylic compounds can contain up to 17 carbon atoms including carboxylic groups but excluding carbon-containing substituent groups.

Suitable alkaline earth oxides include: beryllium, magnesium, calcium, strontium and barium oxides. Calcium oxide is preferred.

Useful carboxylic compounds include:

a. aromatic dicarboxylic acids, e.g., dicarboxylic acids such as 1,2-benzenedicarboxylic acid (phthalic), 1,3-benzenedicarboxylic acid (isophthalic), 1,4-benzenedicarboxylic acid (terephthalic), ortho-, meta- and para-benzenediacetic acids, naphthalene dicarboxylic acid, para-benzene dipropionic acid, anthracene dicarboxylic acid, etc.;

b. aromatic acids containing three or more carboxylic acid groups, e.g., 1,2,3-, 1,2,4- and 1,3,5-benzene tricarboxylic acid, 1,2,3,4-, 1,2,3,5- and 1,2,4,5-benzene tetracarboxylic acid, benzene pentacarboxylic acid, benzene hexacarboxylic acid, naphthalene tetracarboxylic acid, 3,3',4,4'-benzophenone tetracarboxylic acid, 2,2',3,3'-benzophenone tetracarboxylic acid, etc.;

c. aliphatic dicarboxylic acids, e.g., ethanedioic acid to decanedioic acid (oxalic to sebacic acids, i.e., up to 10 carbon atoms), cis-butenedioic acid, trans-butenedioic acid, butynedioic acid, 2,4-hexadienedioic acid, 2,3-dihydroxy butenedioic acid, 3-oxopentanedioic acid, 4-oxoheptanedioic acid; etc.;

d. aliphatic acids containing three or more carboxylic acid groups, e.g., 1,2,3-propanetricarboxylic acid; 1-propene-1,2,3-tricarboxylic acid; 1,2,4-butane-tricarboxylic acid; 1,3,5-pentanetricarboxylic acid; 2-hydroxy-1,2,3-propanetricarboxylic acid; 1,1,2,2-ethanetetracarboxylic acid; etc.; 1,2,3,4-butane-tetracarboxylic acid; 1,1,1-ethane tricarboxylic acid, etc.;

e. alicyclic dicarboxylic acids, e.g., 1,2-cyclopropane dicarboxylic acid; 1,3-cyclobutane dicarboxylic acid; 1,1-cyclopentane dicarboxylic acid; 1,4-cyclohexane dicarboxylic acid; 1-cyclohexene-1,4-dicarboxylic acid; 1,5-cyclooctane dicarboxylic acid; cyclohexadiene-1,2-dicarboxylic acid; 1,3-cyclohexadiene-1,4-dicarboxylic acid, etc.;

f. alicyclic acids containing three or more carboxylic acid groups, e.g., 1,2,3-cyclopropane tricarboxylic acid; 1,2,3,4-cyclopentane tetracarboxylic acid; 1,2,3,4-cyclohexane tetracarboxylic acid; 1,2,3,4-cyclobutane tetracarboxylic acid, and 1,2,3,4,5,6-cyclohexane hexacarboxylic acid; etc.;

g. anhydrides, e.g., succinic, maleic, phthalic, glutaric, adipic anhydrides, 1,3-cyclopentanedicarboxylic anhydride, 1,2,4-benzene tricarboxylic, 1,2-anhydride, 1,2,4-benzene-tricarboxylic-1,2:1',2':4,4'-trianhydride, malic anhydride, citraconic anhydride, 3-hexanedioic anhydride, 1,3-cyclobutane dicarboxylic anhydride, 1,2,3,4-cyclobutanetetracarboxylic-1,2:3,4 dianhydride, 1,2,3,4-cyclopentanetetracarboxylic-1,2:3,4 dianhydride, decanedioic anhydride, 1,2,4,5-benzene tetracarboxylic-1,2:4,5-dianhydride (pyromellitic dianhydride), 1,2,3,4-benzene tetracarboxylic-1,2:3,4-dianhydride, 1,2,4,5-benzene tetracarboxylic-1,2-anhydride, 1,2,4,5-cyclohexane tetracarboxylic-1,2:4,5-dianhydride, 1,2,3,4-cyclohexane tetracarboxylic-1,2:3,4-dianhydride, naphthalene dicarboxylic anhydride, benzene hexacarboxylic-1,2:3,4:5,6-trianhydride, 1,4,5,8-naphthalene tetracarboxylic-1,8:4,5-dianhydride, 2,3,6,7-naphthalene tetracarboxylic-2,3:6,7-dianhydride, 3,3',4,4'-benzophenone tetracarboxylic-3,4:3',4-dianhydride; 2,2',3,3'-benzophenone tetracarboxylic-2,3:2',3'-dianhydride.

Other isomers of the foregoing carboxylic compounds are also useful in cooperation with the alkaline earth oxide. Substituted derivatives of said carboxylic compounds are also useful such as carboxylic compounds substituted with halo, e.g., bromine, chlorine, fluorine, alkyl ($C_1$ to $C_4$), vinyl, allyl, alkoxy ($C_1$ to $C_2$), phenyl, phenoxy, hydroxy and benzoyl.

The individual carboxylic compounds set forth above provide optimum results at specific weight percents within the above broad range. It is within the ability of one skilled in the art to determine the concentration range of specific carboxylic compounds. The preferred range for pyromellitic dianhydride is 0.1 to 1.0 percent by weight. The alkaline earth oxide and the carboxylic compound are incorporated into the adhesive composition by melt blending during compounding of the adhesive.

Optionally, singly or in combination, the following compounds can be present in the adhesive composition based on the weight thereof: 0.1 to 1.0 percent by weight of a substantially linear polycarbodiimide having an average of at least two carbodiimide groups per molecule: 0.1 to 2.0 percent by weight of a compound taken from the group consisting of hindered phenols, nitrogen-containing hindered phenols and hindered secondary amines. These optional compounds are described below.

The linear polycarbodiimide is represented by the formula

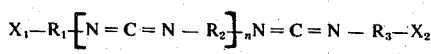

where $R_1$, $R_2$, and $R_3$ are $C_1$–$C_{12}$ aliphatic, $C_6$–$C_{15}$ cycloaliphatic, or $C_6$–$C_{15}$ aromatic divalent hydrocarbon radicals, and combinations thereof; $X_1$ and $X_2$ are H,

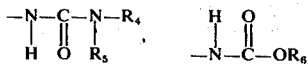

where $R_4$, $R_5$, and $R_6$ are $C_1$–$C_{12}$ aliphatic, $C_5$–$C_{15}$ cycloaliphatic and $C_6$–$C_{15}$ aromatic monovalent hydrocarbon radicals and combinations thereof and additionally $R_4$ or $R_5$ can be hydrogen; and $n$ is a number of at least 1, preferably 1 to 7. The useful polycarbodiimides have an average of at least two carbodiimide groups (i.e., two —N=C=N— groups) per molecule and an average molecular weight of less than about 500 per carbodiimide group. These polycarbodiimides can be aliphatic, cycloaliphatic, or aromatic polycarbodiimides. The terms aliphatic, cycloaliphatic, and aromatic as used herein indicate that the carbodiimide group is attached directly to an aliphatic group, a cycloaliphatic group, or an aromatic nucleus respectively. For example, these carbodiimides can be illustrated by the formula

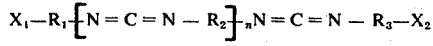

wherein $R_1$, $R_2$, and $R_3$ are independently aliphatic, cycloaliphatic, or aromatic divalent hydrocarbon radicals and $n$ is at least 1 and preferably 1–7. $X_1$ and $X_2$ are defined as hereinbefore. Polycarbodiimides useful for the compositions of this invention have more than two polycarbodiimide groups and thus more than three divalent hydrocarbon groups (i.e., $R_1$, $R_2$, $R_3$ . . . $R_n$) and each of these hydrocarbon groups can be the same or different from the others so that the polycarbodiimides can have aliphatic, cycloaliphatic, and aromatic hydrocarbon groups in one polycarbodiimide molecule. A preferred polycarbodiimide is a mixture of hindered aromatic polycarbodiimides having an average molecular weight of about 1000 containing units of

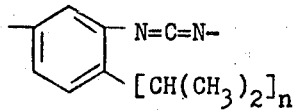

where $n$ has an average value of about 3, sold by Naftone, Inc., New York, New York.

Polycarbodiimides can be prepared for use in this invention by well-known procedures. Typical procedures are described in U.S. Pat. Nos. 3,450,562 to Hoeschele; 2,941,983 to Smeltz; 3,193,522 to Neumann et al.; and 2,941,966 to Campbell.

Useful hindered phenols include: 2,6-ditertiarybutyl-p-cresol; 4,4'-bis(2,6-ditertiarybutylphenol); 4,4', 4''-(2,4,6-trimethyl-5-phenyl) trimethylene) tris 2,6-ditert.-butyl phenol; 1,3,5-trimethyl-2,4,6-tris[3,5-ditertiary-butyl-4-hydroxybenzyl] benzene; 4,4'-butylidene bis(6-tertiary-butyl-m-cresol); α,α'-oxybis(2,6-di-tert.-butyl-p-cresol; 2,6-di-tert.-butyl-α-methoxy-p-cresol; 2,6 bis(5-tert.-butyl-4-hydroxy-m-tolyl) mesitol (Plastanox 80); 4,4'-methylene-bis(2,6-di-tert.-butylphenol) [Ethyl AO 702, Ionox 220]; 2,2'-methylene-bis-(6-tert.-butyl-4-methyl) phenol; 4,4'-(tetramethyl-p-phenylene) dimethylene-bis-2,6-di-tert.-butyl phenol; 2,2',6,6'-tetra-tert.-butyl-p,p' biphenol; 3,5-ditert.-butyl-4-hydroxy benzyl alcohol; 4,4'-isopropylidine-bis-butylated phenol; 2,5-ditert.-butyl hydroquinone, 2,2'-methylenebis(6-tert-butyl-4-methyl phenol); 2,2'-methylenebis(6-tert-butyl-4-ethyl phenol); 2,2'-methylenebis [4-methyl-6-(1,1,3,3-tetramethyl)-butyl phenol]; 4,4'bis(2-tert-butyl-5-methyl phenol) sulfide; 4,4'-butylidene-bis(2-tert-butyl-5-methyl phenol); 2,2'-methylenebis(4,6-dimethyl phenol); 2-tert-butyl-4(4-tert-butyl phenyl)phenol; 2-tert-butyl-4-phenyl phenol; 2,6-dibenzyl-4-methyl phenol; 2-benzyl-4-methyl phenol; 2-benzyl-6-tert-butyl-4-methyl phenol; 2-benzyl-6-tert-butyl-4-ethyl phenol; 2,4-dimethyl-6-(1-methyl-1-cyclohexyl) phenol, 2,6-diisopropyl-4-methyl phenol; 2,4-dimethyl-6-isopropyl phenol; 2-tert-butyl-4,6-dimethyl phenol; 2-tert-butyl-4-methyl phenol; 2-(1,1,3,3-tetra-methyl butyl)-4-methyl phenol; 2,4,6-trimethyl phenol; 2,6-di-tert-butyl-4-methyl phenol; 2,6-di-tert-butyl-4-ethyl phenol; 4-phenyl phenol; 2,6-diisopropyl phenol; 2,6-di-tert-butyl-4-phenyl phenol; 2,6-di-tert-butyl-4(4-tert-butyl-phenyl)phenol; 2,5-di-tert-butyl-hydroquinone; 2,5-di-tert-amyl-hydroquinone, and alpha-conidendrine. Mixtures of the foregoing may be used. The preferred hindered phenol is tetrakis[methylene-3-(3',5'-ditertiary-butyl-4'-hydroxyphenyl) propionate] methane.

Suitable nitrogen-containing hindered phenols include 2,6-di-tert-butyl-α-dimethylamino-p-cresol; 4-hydroxydodecananilide; 4-hydroxy butyranalide; p-butyl-aminophenol; 2,4-bis[n-octylthio]-6[4'-hydroxy-3,5' ditertiary butyl anilino]-1,3,5-triazine. A preferred compound is CHA 1014 sold by Ciba-Geigy, Ardsley, New York.

Useful secondary amine compounds are 4,4'-dioctyl diphenylamine; diethyl dinonyl diphenylamine; 4-isopropoxy diphenylamine; N,N'-diphenyl-1,2-propanediamine; octylated diphenylamine; p-isopropoxydiphenylamine; phenyl-α-naphthylamine; phenyl β-naphthylamine; N,N'-diphenylethylene diamine; N',N'-di-o-tolylethylene diamine; N',N'-diphenyl-1,2-propylene diamine; N,N'-diphenyl-p-phenylene diamine. A preferred secondary amine is N,N'-di-2-naphthylparaphenylenediamine sold by Vanderbilt Chemical Co., Nashville, Tennessee.

The properties of the compositions of this invention can be modified by the incorporation of various conventional inorganic fillers in addition to alkaline earth oxides such as wood flour, silicates, silica gel, alumina, clays, chopped fiberglass, titanium dioxide, barium sulfate, calcium carbonate, carbon black, etc. In general, fillers have the effect of increasing the melt viscosity and the modulus or stiffness of the composition at various elongations.

The properties of the compositions of this invention can be further modified by the incorporation of thermally stable thermoplastic polymers of ethylenically unsaturated monomers including homopolymers of vinyl esters such as vinyl acetate, copolymers of these vinyl esters with other vinyl monomers such as ethylene, vinyl chloride and the like, and polymers of alkyl acrylates and methacrylates, or thermally stable condensation polymers such as polyesters and polyamides, and the like. For example, the addition of a copolymer of ethylene and vinyl acetate often increases the tackiness of pressure sensitive adhesive compositions of this invention. These modifying polymers typically have melt viscosities above about 10,000 centipoises at 200°C. and thus are not low molecular weight thermoplastic resins as defined herein.

The compositions can also be colored by the addition of organic or inorganic pigments or organic dyes where their effect is desired. Suitable inorganic pigments include rutile and anatase titanium dioxides, aluminum powder, cadmium sulfides and sulfo-selenides, lead antimonate, mercury cadmiums, chromates of nickel, tin and lead, ceramic greens such as chromium, cobalt, titanium and nickel oxides, ceramic blacks such as chromium, cobalt and iron oxides, carbon black, ultramarine blue, and the like. Suitable organic pigments include phthalocyanine blues and greens, quinacridones, and the like. Suitable dyes include disperse dyes such as Colour Index Disperse Blues 59, 63 and 64. Optical brightner such as "Uvitex" CF, sold by Ciba Corp., and "Tinopal" AN, sold by Geigy Chemical Corp., may also be incorporated where their effect is desired.

Plasticizers including phthalate esters such as dioctyl phthalate, and aryl phosphates such as tricresyl phosphate, and substituted sulfonamides such as N-cyclohexyl-p-toluene-sulfonamide and the like, may be added for applications where their effect is desired. Flame retardant additives, such as zinc borate, antimony trioxide, tris(2,3-dichloropropyl) phosphate, tris(2,3-dibromopropyl) phosphate, chlorinated waxes, and the like may be added, if desired. Other minor additives such as surfactants or lubricants may also be added.

One of the important advantages of the thermoplastic adhesive compositions of this invention is that the copolyester elastomers and the low molecular weight thermoplastic resins are easy to blend together due to the relatively low melt viscosity of these compositions at elevated temperatures as compared to compositions of the prior art having comparable bond strength. The components of the compositions of this invention can be blended by variously well-known procedures such as, for example, blending in molten form or blending in a solvent. Blending in the melt may be carried out by first melting the stabilized segmented copolyester elastomer and then adding low molecular weight thermoplastic resin to the melt, by first melting the low molecular weight thermoplastic resin and then adding stabilized segmented copolyester elastomer to the melt, or by first blending the segmented copolyester elastomer and the low molecular weight thermoplastic resin together in finely divided form and then melting the blend, for example, on a hot roller mill or by simultaneously feeding the components to an extruder. The alkaline earth oxide stabilizer compound and carboxylic compound, with or without optional components, can be present prior to blending or can be added with the other components individually or as a mixture.

One method of mixing the alkaline earth oxide stabilizer compound or mixture thereof with the segmented copolyester elastomer is to take an amount of the elastomer and mix in the amount of alkaline earth oxide stabilizer and carboxylic compound and any optional additives described above either individually or as a mixture.

In addition to these blending procedures, it is also possible to take the copolyester from the synthesis step and, while it is still molten, blend solid, premelted or liquid low molecular weight thermoplastic resin with it. The stabilizer compound, carboxylic compound or mixture thereof as well as other ingredients such as antioxidants, fillers, plasticizers, and the like can also be added at this time. This blending process can be carried out with an in-line mixer or with a separate mixing vessel, and has the advantage that it does not require isolation of the copolyester.

The thermoplastic compositions of this invention can also be blended by dissolving the segmented copolyester and the low molecular weight thermoplastic resin in a solvent. Suitable solvents for preparing these solutions include chlorinated hydrocarbons such as methylene chloride, chloroform, trichloroethylene, solvent mixtures such as mixtures of trichloroethylene and isopropanol, and the like.

Compositions containing about 50 percent by weight or more of segmented copolyester elastomer can be used as concentrates for further compounding with the same or other low molecular weight thermoplastic resins and modifiers, as well as being useful as such. Such concentrated compositions have the advantage of being processable with additional components at lower temperatures and shear requirements than the segmented copolyester elastomer itself. For example, a mixture containing an equal weight of segmented copolyester elastomer and low molecular weight, thermoplastic styrene homopolymer is typically blended at a minimum temperature of about 170°C. However, additional low molecular weight thermoplastic resins can be mixed with this concentrate at a minimum blending temperature of about 140°C. Moreover, additional low molecular weight thermoplastic resins which have limited compatibility with the segmented copolyester elastomer alone tend to be more compatible with such concentrates.

The compositions of this invention are useful as adhesives and as coating compositions. These compositions can be applied in the form of a dry blend, or in molten form.

Conventional application equipment can be used for applying the compositions of this invention. For application of these compositions in melt form, dipping, roll coating, calendaring, curtain coating, extruding, hot spraying, and other hot melt application techniques can be used. Powder coatings of appropriate nontacky compositions can also be applied by known fluidized bed techniques, electrostatic powder spray application, or plasma spraying.

In using the compositions of this invention as hot melt adhesives, the joining step can be accomplished by applying the molten composition to one surface, bringing the other surface into contact with the molten composition, and allowing the bond to cool. Coatings of these compositions can be bonded to other surfaces or themselves by heat or solvent activation of the coating, and contacting the activated coating with the second surface and allowing the bond to cool or the solvent to evaporate. Heat activation of the coating is typically carried out in an oven or using an infrared lamp. Simultaneous application of heat and pressure, or heat sealing, can be used with these compositions to accomplish bonding. High frequency dielectric and ultrasonic waves can also be used to activate these compositions to effect bonding.

The adhesive compositions of this invention are characterized by an outstanding combination of properties.

These compositions have demonstrated excellent adhesion to many substrates including difficultly adherable substrates such as melamine-formaldehyde laminated plastics (Formica), etc. The compositions have high temperature bond strengths, for example, as shown by cleavage failure temperatures higher than about 70°C. They have good low temperature flexibility, that is, resistance to breakage on impact, and a minimum elongation of 50 percent at room temperature. They have tensile strengths higher than 14.06 kg./sq. cm. (200 psi.) at room temperature.

Significantly longer shelf life, as measured by the moisture aging test described below, is obtained with the adhesive compositions of this invention when compared with unstabilized adhesive compositions or stabilized adhesive compositions of the prior art described above. The adhesive composition is very versatile since merely by adjusting the ratio of alkaline earth oxide level to carboxylic compound level, stable viscosity profiles can be obtained with a wide variety of adhesive compositions.

Due to the presence of the alkaline earth oxide and carboxylic compound, the compositions have good pot life and improved stability at elevated temperatures, e.g., when heated to 170° to 220°C. for extended periods of time within the period of 12 to 24 hours or more. Due to the higher levels of alkaline earth oxide present the cost of the adhesive composition is reduced.

The compositions containing up to 50 percent by weight of segmented copolyester elastomer are particularly useful as hot melt adhesives in a wide variety of adhesive use applications such as edge banding and surface lamination, for example, in furniture manufacture, vinyl lamination, sole attachment and box-toe construction in shoe assembly.

Compositions containing about 50 percent or more by weight of thermoplastic segmented copolyester elastomer are particularly useful in the preparation of molded, extruded, and dipped goods, coatings, binders, extruded adhesives, sealants, and the like. Films can be prepared from these compositions by molding, extrusion and calendaring techniques. These compositions typically contain about 50 to 99 percent by weight of segmented copolyester elastomer and about 1 to 50 percent by weight of low molecular weight thermoplastic resin. Preferably they contain about 50 to 95 percent by weight of segmented copolyester elastomer and about 5 to 50 percent by weight of low molecular weight thermoplastic resin.

EXAMPLES OF THE INVENTION

The results of the various tests found in the examples were obtained by the procedures indicated below.

Bond Preparation of Particle Board/Melamine Formaldehyde Laminate

Test samples used in the examples are prepared from precut pieces of particle board, 2.54 cm. wide × 2.54 cm. thick × 10.16 cm. long, and precut strips of melamine-formaldehyde laminate, 1.9 cm. wide × 0.16 cm. thick × 5.08 cm. long. Adhesive is melted under an infrared lamp or on a temperature-regulated hot plate, and approximately 0.5 g. is applied to a 1.9 cm. × 1.9 cm. area at one end of the particle board strip, and laminate is formed while hot to the room temperature melamine strip in the form of a lap joint. Depending on the intended end use, the adhesive is applied either to the cut edge or surface of the particle board. Lamination is accomplished with the application of pressure to provide intimate contact and to achieve the goal adhesive thickness of 0.13 ± 0.025 mm on the surface and 0.254 ± 0.025 mm on the edge. The excess adhesive fillet is carefully trimmed from the test sample, which is allowed to age at least overnight before testing.

Cleavage tests were performed as follows:

Programmed Temperature Cleavage

Thermal testing of the aged sample is carried out in a circulating oven, with the adhesive-bonded area in a horizontal configuration and the melamine laminate on the bottom. A 0.45 kg. weight is suspended from the melamine strip 2.54 cm. from the edge of the bonded area. The oven temperature is programmed linearly, from room temperature at a rate of 10°C. (18°F.) per hour, and the failure temperature is taken when the weight falls.

Viscosity

The viscosity values are determined by charging the segmented copolyester elastomer or blend into a Brookfield Thermosel System, manufactured by Brookfield Engineering Laboratories, Stoughton, Massachusetts, equipped with a RVT model viscometer, No. 27, 28 or 29 spindle, preheated at 190°–195°C. and a proportional temperature controller, Model 63A. To insure accuracy of temperature the system was calibrated prior to use with high temperature viscosity standard fluid available from Brookfield Engineering Laboratories. Desired temperature is maintained by use of the proportional temperature controller. As soon as the adhesive blend was molten the spindle was lowered into the melt and the time recorded. The viscometer was run at 0.5 to 2.5 rpm. The rpm in the examples below is 1.0 unless stipulated. Initial viscosity is the value obtained approximately 30 minutes after start of the viscometer which is generally sufficient to obtain equilibrium of viscosity, and at intervals for a maximum of 12 to 24 hours.

Ring and Ball Softening Points

The softening points of the blends can be determined by ASTM method E 28–67.

Moisture Aging 15.24 cm. (6 in.) × 15.24 cm. (6 in.) plaque of adhesive, 1.27 mm (50 mils) ± 0.13 mm (5 mils) thick, were prepared using a hot press (Rucker, PHI) at 773.3 kg./sq. cm. (11,000 psi.) and 150°–200°C. The plaques were then placed in an air-tight container with a saturated salt solution to obtain a constant humidity environment. A saturated solution of $Ca(NO_3)_2 \cdot 4H_2O$ gave a 51% Relative Humidity (R.H.) environment at 24.5°C. Samples of the plaques were periodically removed and tested for viscosity as described earlier.

The following procedure and examples, wherein the weights are in grams, illustrate the invention.

Adhesive Blend Preparation

To a 0.4731 liter (1 pint) aluminum can, heated in an electric heating block at 190°C. and equipped with an air driven stirrer, was added the amount of thermoplastic resin(s), alkaline earth oxide, carboxylic compound and optional components (either individually or in combination). The segmented copolyester was added after the resin(s) was molten and blended. A uniform adhesive blend was obtained with constant agitation after generally for 1 hour. The blend was then discharged into Teflon-lined aluminum trays and was allowed to cool to room temperature.

In the examples the following components were present, as indicated by the component numbers in the blends and in the heading of the various tables.

1. Piccoumaron 410HL resin, a polyindene type highly aromatic, thermoplastic petroleum resin having ring and ball softening point of about 110°C., and a melt viscosity of 158 centipoises at 190°C. sold by Hercules, Inc.

2. Barium sulfate, B.A.R., No. 104 foam grade, sold by IMCO-Halliburton Co., Houston, Texas.

3. Segmented copolyester elastomer containing terephthalic acid residue of 27.2 percent, isophthalic acid residue of 7.9 percent, 1,4-butanediol of 19.4 percent, and poly(tetramethylene ether) glycol (PTMEG) having a molecular weight of about 1000 of 44.5 percent, the elastomer containing about 48.7 percent short chain ester units and being characterized by a melt index (2160 g./200°C.) of 6–8, a TMA S.P. of 144°C. and a DTA crystalline M.P. of 154°C. The 1,4-butanediol/PTMEG mole ratio is 5.0 and the dimethylterephthalate to total phthalate ratio is 0.78.

4. Piccovar L-30 is a polyindene petroleum resin having a softening point of 30°C. sold by Hercules, Inc.

5. Piccolastic A-50 is a low molecular weight styrene homopolymer having a ring and ball softening point of about 50°C. and a melt viscosity of 29 centipoises at 190°C. sold by Hercules, Inc.

6. PMDA (pyromellitic dianhydride) is sold by E. I. du Pont de Nemours and Co., Inc.

7. Stabaxol PCD (polycarbodiimide) sold by Mobay Chem. Co., Pittsburgh, Pa.

8. Irganox 1010 is a tetrakis-[methylene-3-(3′,5′-ditertiary-butyl-4′-hydroxyphenol) propionate methane high melting phenolic antioxidant sold by Ciba-Geigy Chemical Co.

9. CaO, Reagent Grade, sold by Fisher Chemical Co.

10. MgO, reagent grade, sold by Fisher Chemical Co.

11. BaO, reagent grade, sold by Fisher Chemical Co.

12. Segmented copolyester elastomer as component 3 but has a melt index (2160 g./200°C. of 14–21.

13. Aristowax 143 Paraffin wax, sold by ARCO Chemical Company.

14. Benzoflex S-552 Pentaerythritol tetrabenzoate, sold by Velsicol Chemical Company.

15. Piccotex 75 Vinyl toluene copolymer resin sold by Hercules, Inc.

16. Piccolastic D-100 Intermediate molecular weight polystyrene resin sold by Hercules, Inc.

17. Acids and anhydrides Lab assistance kit OCA-120A Chemical Service Inc., West Chester, Pa.

18. Ethylene-vinyl acetate resin, 28% vinyl acetate, melt index 22, sold by E. I. du Pont de Nemours and Co., Inc., Wilmington, Delaware.

19. Segmented copolyester derived from about 31.3 percent terephthalic acid; 17.4 percent 1,4-cyclohexane carboxylic acid; 30.5 percent butanediol and 20.8 percent polytetramethylene ether glycol (1000 MW), said copolyesters containing about 76.8 percent short chain ester units and having a melting point of 153°C. measured by differential scanning calorimetry, and a melt index of about 7 measured at 190°C.

20. TiO$_2$ reagent grade, sold by Fisher Chemical Co.

TABLE I

EXAMPLES 1 TO 3

All blends contain 40 g. component 3, 25 g. component 1, 20 g. component 4 in addition to:

| Example | Components (g.) | | | | | Viscosity (MCPS) at 190°C. | | | Cleavage (°C.) |
|---|---|---|---|---|---|---|---|---|---|
| | 9 | 6 | 18 | 8 | 7 | 1 hr. | 6 hr. | 12 hr. | |
| 1 | 12.4 | 1.0 | 3.2 | 0.6 | 0.3 | 230 | 230 | 230 | 125 |
| 2 | 10.0 | 1.0 | — | — | — | 115 | 115 | 115 | 132 |
| 3 | 10.0 | 0.5 | — | 0.5 | — | 132 | 132 | 132 | 132 |
| Control | — | 1.0 | — | — | — | 75 | 42 | 26 | |
| Control | — | — | — | — | — | 100 | 86 | 75 | |
| Control | 10.0 | — | — | — | — | 165 | 300 | 680 | |
| Control | 12.4 | — | 3.2 | 0.6 | 0.3 | 390 | 910 | Gel | |
| Control | 30.0 | — | — | — | — | 275 | 810 | Gel | |
| Control | 5.0 | — | — | — | — | 140 | 155 | 200 | |

Table I illustrates the effect of CaO/PMDA on viscosity.

TABLE II

EXAMPLES 4 TO 8

All blends contain 40 g. component 3, 25 g. component 1, 20 g. component 4, 3.2 g. component 18, 0.6 g. component 8, 0.3 g. component 7, in addition to:

| Example | Components (g.) | | Viscosity (MCPS) at 190°C. | | | Cleavage (°C.) |
|---|---|---|---|---|---|---|
| | 9 | 6 | 1 hr. | 6 hr. | 12 hr. | |
| Control | 12.4 | — | 390 | 910 | Gel | — |
| 4 | 12.4 | 0.1 | 260 | 310 | 330 | 97 |
| 5 | 12.4 | 0.5 | 220 | 220 | 220 | 120 |
| 6 | 12.4 | 1.0 | 230 | 230 | 230 | 125 |
| 7 | 12.4 | 5.0 | 105 | 82 | 65 | 106 |
| 8 | 32.4 | 5.0 | 185 | 165 | 155 | 100 |

Table II illustrates the range of PMDA in the adhesive composition.

TABLE III

EXAMPLES 9 TO 11

All blends contain 40 g. component 3, 25 g. component 1, 20 g. component 4 in addition to:

| Example | Components (g.) | | | | | Viscosity (MCPS) at 190°C. | | | Cleavage (°C.) |
|---|---|---|---|---|---|---|---|---|---|
| | 9 | 6 | 18 | 8 | 7 | 1 hr. | 6 hr. | 12 hr. | |
| 9 | 5.0 | 0.5 | — | — | — | 120 | 120 | 120 | 125 |
| 10 | 22.4 | 1.0 | 3.2 | 0.6 | 0.3 | 235 | 235 | 235 | 120 |

TABLE III-continued

EXAMPLES 9 TO 11
All blends contain 40 g. component 3, 25 g. component 1, 20 g. component 4 in addition to:

| Example | Components (g.) | | | | | Viscosity (MCPS) at 190°C. | | | Cleavage (°C.) |
|---|---|---|---|---|---|---|---|---|---|
| | 9 | 6 | 18 | 8 | 7 | 1 hr. | 6 hr. | 12 hr. | |
| 11 | 32.4 | 1.0 | 3.2 | 0.6 | 0.3 | 280 | 290 | 290 | 114 |

Table III illustrates the range of CaO in the adhesive composition.

TABLE

EXAMPLES 12 TO 14
All blends contain 40 g. component 3, 25 g. component 1, 20 g. component 4, 1 g. component 6, in addition to 10 g. of:

| Example | Component | Viscosity (MCPS) at 190°C. | | | Cleavage (°C.) |
|---|---|---|---|---|---|
| | | 1 hr. | 6 hr. | 12 hr. | |
| 12 | 9 | 115 | 115 | 115 | 132 |
| 13 | 11 | 160 | 160 | 160 | 118 |
| 14 | 10 | 210 | 200 | 175 | 125 |

Talbe IV illustrates various alkaline earth oxides in the adhesive composition.

TABLE V

EXAMPLES 15 TO 23
All blends contain 40 g. component 3, 25 g. component 1, 20 g. component 4, 10 g. component 9, in addition to:

| Example | Amount (g.) | Carboxylic Compound | Viscosity (MCPS) at 190°C. | | | Cleavage (°C.) |
|---|---|---|---|---|---|---|
| | | | 1 hr. | 6 hr. | 12 hr. | |
| 15 | 1.0 | (PMDA) Pyromellitic dianhydride | 115 | 115 | 115 | 132 |
| 16 | 1.0 | Maleic anhydride | 120 | 124 | 127 | 78 |
| 17 | 0.1 | Fumaric acid | 120 | 115 | 110 | 85 |
| 18 | 0.5 | Terephthalic acid | 140 | 135 | 125 | 98 |
| 19 | 0.2 | Adipic acid | 120 | 130 | 150 | 83 |
| 20 | 0.5 | Citric acid | 130 | 130 | 130 | 79 |
| 21 | 0.5 | Benzene tetra-carboxylic acid (1,2,4,5-) | 115 | 125 | 125 | 100 |
| 22 | 0.5 | Cyclohexane tetra-carboxylic acid (1,2,4,5-) | 140 | 135 | 135 | 118 |
| 23 | 0.2 | Naphthalene tetra-carboxylic acid (1,4,5,8-) | 140 | 150 | 180 | 96 |
| Control | — | None | 165 | 300 | 680 | — |

Table V illustrates various carboxylic compounds in the adhesive composition.

TABLE VI

EXAMPLES 24 TO 26

| Example | Component | Amount (g.) | Viscosity (MCPS) at 190°C. | | | Cleavage (°C.) |
|---|---|---|---|---|---|---|
| | | | 1 hr. | 6 hr. | 12 hr. | |
| 24 | 3 | 40.0 | | | | |
| | 1 | 20.0 | | | | |
| | 4 | 20.0 | 1 hr. | 6 hr. | 12 hr. | |
| | 5 | 20.0 | | | | |
| | 9 | 10.0 | 34 | 38 | 38 | 110 |
| | 6 | 1.0 | | | | |
| | 8 | 0.5 | | | | |
| 25 | 3 | 50.0 | | | | |
| | 16 | 10.0 | | | | |
| | 15 | 20.0 | 1 hr. | 6 hr. | 12 hr. | |
| | 13 | 5.0 | | | | |
| | 14 | 15.0 | 120 | 110 | 100 | — |
| | 9 | 5.0 | | | | |
| | 6 | 0.5 | | | | |
| | 20 | 2.0 | | | | |
| | 8 | 0.5 | | | | |
| 26 | 19 | 40.0 | | | | |
| | 1 | 25.0 | 1 hr. | 6 hr. | 12 hr. | |
| | 4 | 20.0 | | | | |
| | 9 | 10.0 | 92 | 85 | 82 | 121 |
| | 6 | 1.0 | | | | |

Table VI illustrates different adhesive composition.

TABLE VIII

EXAMPLES 27 AND 28
1.27 mm (50 mil) plaques exposed to constant 51% Relative Humidity (R.H.) at constant temperature.

| Example | Component | Amount (g.) | | Viscosity (MCPS) at 190°C. | | |
|---|---|---|---|---|---|---|
| | | | | 1 hr. | 6 hr. | 12 hr. |
| Control 1 | 3 | 40.0 | Initial | 100 | 86 | 75 |
| | 1 | 25.0 | 1 day 51% RH | 100 | 60 | 39 |
| | 4 | 20.0 | 1 week 51% RH | 83 | 55 | 33 |
| Control 2 | 3 | 40.0 | | | | |
| | 1 | 20.0 | | | | |
| | 4 | 13.0 | Initial | 360 | 360 | 360 |
| | 2 | 27.0 | 1 day 51% RH | 130 | 23 | 12 |
| | 18 | 3.2 | 1 week 51% RH | 110 | 10 | — |
| | 7 | 0.3 | | | | |
| | 9 | 2.4 | | | | |
| | 8 | 0.6 | | | | |
| | 6 | 1.0 | | | | |
| 27 | 3 | 40.0 | | | | |
| | 1 | 25.0 | Initial | 115 | 115 | 115 |
| | 4 | 20.0 | 1 week 51% RH | 150 | 150 | 150 |
| | 9 | 10.0 | | | | |
| | 6 | 1.0 | | | | |
| 28 | 3 | 40.0 | | | | |
| | 1 | 25.0 | | | | |
| | 4 | 20.0 | Initial | 220 | 220 | 220 |
| | 9 | 12.4 | 1 week 51% RH | 320 | 350 | 350 |
| | 6 | 1.0 | | | | |
| | 18 | 3.2 | | | | |
| | 7 | 0.3 | | | | |
| | 8 | 0.6 | | | | |

Table VII illustrates the effect of moisture on adhesive compositions. Control 1 contains no alkaline earth oxide and carboxylic compound. Control 2 contains less than 2.4% by weight alkaline earth oxide.

I claim:

1. A thermally stabilized thermoplastic hot melt adhesive composition which comprises, based on the total thermoplastic components, (A) 1 to 99 percent by weight of thermoplastic segmented copolyester elastomer consisting essentially of a multiplicity of recurring short chain ester units and long chain ester units joined through ester linkages, said short chain ester units amounting to 15 to 75 percent by weight of said copolyester and being of the formula

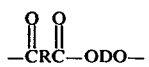

and said long chain ester units amount to 25 to 85 percent by weight of said copolyester and being of the formula

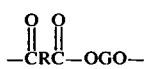

wherein R is the divalent radical taken from the group consisting of cyclic, aromatic or aliphatic radicals remaining after removal of the carboxyl groups from a cyclic, aromatic or aliphatic dicarboxylic acid having a molecular weight of less than 350, D is the divalent radical remaining after removal of the hydroxyl groups from organic diol having a molecular weight of less than 250, and G is the divalent radical remaining after removal of the terminal hydroxyl groups from long chain glycol having an average molecular weight of 350 to 6000, said copolyester having a melt index of less than 150 and a melting point of at least 90°C.; (B) 1 to 99 percent by weight of low molecular weight thermoplastic resin which forms compatible mixtures with the segmented copolyester, is thermally stable at 150°C., and has a melt viscosity of less than 10,000 centipoises at 200°C.; stabilized with (C) 5.0 to 30 percent by weight, based on the weight of elastomer and resin, of an alkaline earth oxide taken from the group consisting of beryllium, magnesium, calcium, strontium and barium oxide, in combination with (D) 0.05 to 5.0 percent by weight, based on the weight of elastomer and resin, of a carboxylic compound, taken from the group consisting of an aromatic compound having at least two carboxylic acid groups, an aliphatic compound having at least two carboxylic acid groups and anhydrides thereof, said carboxylic compound, when unsubstituted, containing up to 17 carbon atoms inclusive of said carboxylic acid groups.

2. The composition of claim 1 wherein the alkaline earth oxide is calcium oxide.

3. The composition according to claim 1 wherein the carboxylic compound is an aliphatic compound having at least two carboxylic acid groups, the number of carbon atoms inclusive of said carboxylic acid groups being ten.

4. The composition according to claim 1 wherein the carboxylic compound is pyromellitic dianhydride.

5. The composition of claim 1 wherein R is a divalent aromatic radical remaining after removal of the carboxyl groups from an aromatic dicarboxylic acid.

6. The composition of claim 1 wherein there is present in combination with the alkaline earth oxide and carboxylic compound 0.1 to 1.0 percent by weight, based on the weight of elastomer and resin, of a substantially linear polycarbodiimide having an average of at least two carbodiimide groups per molecule.

7. The composition of claim 1 wherein there is present in combination with the alkaline earth oxide and carboxylic compound 0.1 to 2.0 percent by weight, based on the weight of elastomer and resin, of at least one compound taken from the group consisting of hindered phenols, nitrogen-containing hindered phenols and hindered secondary amines.

8. The composition of claim 6 wherein there is present in combination with the alkaline earth oxide and carboxylic compound and polycarbodiimide 0.1 to 2.0 percent by weight, based on the weight of elastomer and resin, of at least one compound taken from the group consisting of hindered phenols, nitrogen-containing hindered phenols and hindered secondary amines.

9. The composition of claim 1 wherein the low molecular weight thermoplastic resin is selected from the group consisting of hydrocarbon resins, bituminous asphalts, coal tar pitches, rosins, rosin based alkyd resins, phenolic resins, chlorinated aliphatic hydrocarbon waxes, chlorinated polynuclear aromatic hydrocarbons, and mixtures thereof.

10. The composition of claim 9 wherein the thermoplastic composition comprises 5 to 95 percent by weight of segmented copolyester elastomer and 5 to 95 percent by weight of low molecular weight thermoplastic resin.

11. The composition of claim 9 wherein the thermoplastic composition comprises 20 to 60 percent by weight of segmented copolyester elastomer and 40 to 80 percent by weight of low molecular weight thermoplastic resin.

12. The composition of claim 9 wherein the dicarboxylic acid is an aromatic dicarboxylic acid of 8 to 16 carbon atoms, the low molecular weight diol is aliphatic diol of 2 to 8 carbon atoms, and the long chain glycol is poly(alkylene ether) glycol in which the alkylene group is of 2 to 9 carbon atoms.

13. The composition of claim 12 wherein the short chain ester units amount to about 30 to 65 percent by weight of the copolyester, the long chain ester units amount to about 35 to 70 percent by weight of the copolyester, and the copolyester has a melt index of less than 50 and a melting point of at least 140°C.

14. The composition of claim 13 wherein the dicarboxylic acid is an aromatic dicarboxylic acid selected from the group consisting of terephthalic acid, and mixtures of terephthalic and isophthalic acids, the low molecular weight diol is butanediol, and the long chain glycol is polytetramethylene ether glycol having a molecular weight of 600 to 3000.

15. The composition of claim 14 which comprises 15 to 45 percent by weight of segmented copolyester elastomer and 55 to 85 percent by weight of low molecular weight thermoplastic resin.

16. The composition of claim 15 wherein the low molecular weight thermoplastic resin is a mixture of at least two low molecular weight thermoplastic resins.

17. The composition of claim 16 wherein one of the low molecular weight thermoplastic resins is a styrene polymer.

18. The composition of claim 16 wherein one of the low molecular weight thermoplastic resins is a coumarone-indene resin.

19. The composition of claim 16 wherein one of the low molecular weight thermoplastic resins is a bituminous asphalt.

20. The composition of claim 16 wherein one of the low molecular weight thermoplastic resins is a rosin.

21. The composition of claim 16 wherein one of the low molecular weight thermoplastic resins is a terpene resin.

22. The composition of claim 16 wherein the dicarboxylic acid is a mixture of terephthalic acid and isophthalic acid.

23. The composition of claim 22 wherein the polytetramethylene ether glycol has a molecular weight of 600 to 2100.

24. The composition of claim 23 wherein the short chain ester units amount to 15 to less than 30 percent by weight of the copolyester and the long chain ester units amount to more than 70 to 85 percent of the copolyester.

25. The composition of claim 24 wherein the mixture of terephthalic acid and isophthalic acid contains 60 to 95 percent by weight of terephthalic acid.

26. Method of preparing a thermoplastic composition which comprises blending in molten form, based on the total thermoplastic components.

A. 1 to 99 percent by weight of thermoplastic segmented copolyester elastomer consisting essentially of a multiplicity of recurring short chain ester units and long chain ester units joined through ester linkages, said short chain ester units amounting to 15 to 75 percent by weight of said copolyester and being of the formula:

and said long chain ester units amount to 25 to 85 percent by weight of said copolyester and being of the formula:

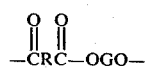

wherein R is the divalent radical taken from the group consisting of cyclic, aromatic or aliphatic radicals remaining after removal of the carboxyl groups from a cyclic, aromatic or aliphatic dicarboxylic acid having a molecular weight of less than 350, D is the divalent radical remaining after removal of the hydroxyl groups from organic diol having a molecular weight of less than 250, and G is the divalent radical remaining after removal of the terminal hydroxyl groups from long chain glycol having an average molecular weight of 350 to 6000, said copolyester having a melt index of less than 150 and a melting point of at least 90°C.;

B. 1 to 99 percent by weight of low molecular weight thermoplastic resin which forms compatible mixtures with the segmented copolyester, is thermally stable at 150°C., and has a melt viscosity of less than 10,000 centipoises at 200°C.; stabilized with C. 5.0 to 30.0 percent by weight, based on the weight of elastomer and resin, of an alkaline earth oxide taken from the group consisting of beryllium, magnesium, calcium, strontium and barium oxide in combination with D. 0.05 to 5.0 percent by weight, based on the weight of elastomer and resin, of a carboxylic compound, taken from the group consisting of an aromatic compound having at least two carboxylic acid groups, an aliphatic compound having at least two carboxylic acid groups and anhydrides thereof, said carboxylic compound, when unsubstituted, containing up to 17 carbon atoms inclusive of said carboxylic acid groups.

27. The method of claim 1 wherein the alkaline earth oxide is calcium oxide.

28. The method of claim 26 wherein the carboxylic compound is an aliphatic compound having at least two carboxylic acid groups, the number of carbon atoms inclusive of said carboxylic acid groups being ten.

29. The method of claim 26 wherein the carboxylic compound is pyromellitic dianhydride.

30. The method of claim 26 wherein R is a divalent aromatic radical remaining after removal of the carboxyl groups from an aromatic dicarboxylic acid.

31. The method of claim 26 wherein there is present in combination with the alkaline earth oxide and carboxylic compound 0.1 to 1.0 percent by weight, based on the weight of elastomer and resin, of a substantially linear polycarbodiimide having an average of at least two carbodiimide groups per molecule.

32. The method of claim 26 wherein there is present with the alkaline earth oxide and carboxylic compound 0.1 to 2.0 percent by weight, based on the weight of elastomer and resin, of at least one compound taken from the group consisting of hindered phenols, nitrogen-containing hindered phenols and hindered secondary amines.

33. The method of claim 31 wherein there is present in combination with the alkaline earth oxide, carboxylic compound and polycarbodiimide 0.1 to 2.0 percent by weight, based on the weight of elastomer and resin, of at least one compound taken from the group consisting of hindered phenols, nitrogen-containing hindered phenols and hindered secondary amines.

34. The method of claim 26 wherein the short chain ester units amount to 15 to 65 percent by weight of the copolyester, the long chain ester units amount to 35 to 85 percent by weight of the copolyester, and the long chain glycol has a melting point of less than 75°C.

35. The method of claim 34 wherein the low molecular weight thermoplastic resin is selected from the group consisting of hydrocarbon resin, bituminous asphalts, coal tar pitches, rosins, phenolic resins, chlorinated aliphatic hydrocarbon waxes, chlorinated polynuclear aromatic hydrocarbons and mixtures thereof.

36. The method of claim 35 wherein the stabilized segmented copolyester is first melted and the low molecular weight thermoplastic resin is added to the melt.

37. The method of claim 35 wherein the low molecular weight thermoplastic resin is first melted and the stabilized segmented copolyester is added to the melt.

38. The method of claim 35 wherein the segmented copolyester and the low molecular weight thermoplastic resin are blended together in finely divided form and melted together and the stabilizer components are present prior to blending.

39. The method of claim 35 wherein the segmented copolyester and the low molecular weight thermoplastic resin are blended together in finely divided form and melted together, the alkaline earth oxide and carboxylic compound being added with the other components.

40. The method of claim 39 wherein there is added with the alkaline earth oxide and carboxylic compound a substantially linear polycarbodiimide having an average of at least two carbodiimide groups per molecule.

41. The method of claim 39 in which there is present with the alkaline earth oxide, carboxylic compound and substantially linear polycarbodiimide at least one compound taken from the group consisting of hindered phenols, nitrogen-containing hindered phenols and hindered secondary amines.

* * * * *